United States Patent
Namba (10) Patent No.: US 9,388,972 B2
(45) Date of Patent: Jul. 12, 2016

(54) LIGHT SOURCE APPARATUS AND PROJECTION TYPE DISPLAY APPARATUS

(71) Applicant: Panasonic Corporation, Kadoma-shi, Osaka (JP)

(72) Inventor: Shu Namba, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 147 days.

(21) Appl. No.: 14/109,378

(22) Filed: Dec. 17, 2013

(65) Prior Publication Data

US 2014/0168616 A1 Jun. 19, 2014

(30) Foreign Application Priority Data

Dec. 19, 2012 (JP) ................................. 2012-276492
Nov. 25, 2013 (JP) ................................. 2013-243160

(51) Int. Cl.
*G03B 21/16* (2006.01)
*F21V 29/00* (2015.01)
*G03B 21/20* (2006.01)

(52) U.S. Cl.
CPC .............. *F21V 29/004* (2013.01); *G03B 21/16* (2013.01); *G03B 21/2033* (2013.01)

(58) Field of Classification Search
CPC ......... F21V 29/00; F21V 19/00; G03B 21/16; G03B 21/14; F21S 2/00; H01L 33/64; H04N 5/74; H05K 7/20
See application file for complete search history.

(56) References Cited

U.S. PATENT DOCUMENTS

| 2006/0209266 A1* | 9/2006 | Utsunomiya | G03B 21/16 353/54 |
| 2009/0103053 A1* | 4/2009 | Ichikawa | H04N 5/7458 353/33 |
| 2012/0327377 A1* | 12/2012 | Ohsugi | H04N 9/3111 353/38 |

FOREIGN PATENT DOCUMENTS

JP 2011-134668 7/2011

* cited by examiner

*Primary Examiner* — Sultan Chowdhury
*Assistant Examiner* — Danell L Owens
(74) *Attorney, Agent, or Firm* — Hamre, Schumann, Mueller & Larson, P.C.

(57) ABSTRACT

A light source apparatus of the present disclosure includes a semiconductor light source, a light source holding member on which the semiconductor light source is disposed, the light source holding member being made of a thermal conductive material, and a cooling member that radiates heat generated by the semiconductor light source through the light source holding member. In addition, the light source apparatus includes an optical lens, an optical lens holding member that holds the optical lens and that is disposed on a light-emitting portion side of the semiconductor light source, and a thermal conductive member having a hole that houses a light-emitting portion of the semiconductor light source. The thermal conductive member is sandwiched between the light source holding member and the optical lens holding member, and comes into close contact with a side surface of the light-emitting portion.

7 Claims, 8 Drawing Sheets

LIGHT SOURCE APPARATUS AND PROJECTION TYPE DISPLAY APPARATUS

CROSS-REFERENCE TO RELATED APPLICATIONS

This application claims priority of Japanese Patent Application No.: 2012-276492 filed on Dec. 19, 2012, and Japanese Patent Application No.: 2013-243160 filed on Nov. 25, 2013, the contents of which are incorporated herein by reference.

BACKGROUND

1. Technical Field

The present disclosure relates to a light source apparatus and a projection type display apparatus including a light source apparatus.

2. Related Art

Conventionally, for a light source apparatus for a projection type display apparatus, a light source apparatus using a high-pressure mercury-vapor lamp is mainstream, but in recent years, light source apparatuses using semiconductor light sources such as light-emitting diodes and laser diodes have been developed. However, the semiconductor light sources are known to decrease their light emission efficiency and shorten their light source life as their temperature increases. Hence, methods for cooling semiconductor light sources have been proposed.

For example, a laser diode in a CAN package has a power supply terminal provided on a back surface of a laser emitting portion. In such a laser diode a larger contact area for conducting heat can be taken on the back surface side more than the laser exiting portion side. Therefore, a scheme for taking heat away from the back surface side is often adopted. JP 2011-134668 A discloses a structure in which an elastic member is pressed by a pressing member to press a semiconductor light source on a surface of a holding member, thereby cooling the semiconductor light source.

Meanwhile, the heating value has also increased with the increase in the power of semiconductor light sources in recent years, and thus, there is a tendency for the temperature of the semiconductor light sources to further increase. Hence, to improve heat radiation efficiency and extend light source life, higher cooling performance is demanded for a light source apparatus.

The present disclosure provides a light source apparatus capable of efficiently cooling a semiconductor light source and suppressing an increase in the temperature of the semiconductor light source.

SUMMARY

A light source apparatus of the present disclosure includes a semiconductor light source, a light source holding member on which the semiconductor light source is disposed, the light source holding member being made of a thermal conductive material, and a cooling member that radiates heat generated by the semiconductor light source through the light source holding member. In addition, the light source apparatus includes an optical lens, an optical lens holding member that holds the optical lens and that is disposed on a light-emitting portion side of the semiconductor light source, and a thermal conductive member having a hole that houses a light-emitting portion of the semiconductor light source. The thermal conductive member is sandwiched between the light source holding member and the optical lens holding member, and comes into close contact with a side surface of the light-emitting portion.

DETAILED DESCRIPTION OF PREFERRED EMBODIMENTS

With the increase in power of semiconductor light sources in recent years, higher cooling performance is demanded for a light source apparatus in order to improve heat radiation efficiency and extend light source life. To improve cooling performance, the inventor of the present invention has focused on effectiveness of increasing heat transfer surface, which, however, has been found to be difficult in terms of the following points. Specifically, there is a power supply terminal on the back surface of a laser. Thus, when insulation measures are provided between the terminal and a laser holder, a contact area on the back surface decreases, resulting in a limit to efficiently taking away heat generated by the laser.

An embodiment will be described in detail below by referring to the drawings as necessary. Note, however, that an unnecessarily detailed description may be omitted. For example, a detailed description of already well-known matters or an overlapping description of substantially the same configuration may be omitted. This is to avoid the following description from unnecessarily becoming redundant and facilitate understanding by those skilled in the art.

Note that the inventor provides the accompanying drawings and the following description in order for those skilled in the art to thoroughly understand the present disclosure, and thus, it is not intended that the subject matter described in the claims is limited thereby.

Embodiment

An embodiment will be described below using the drawings.

Figure 1:
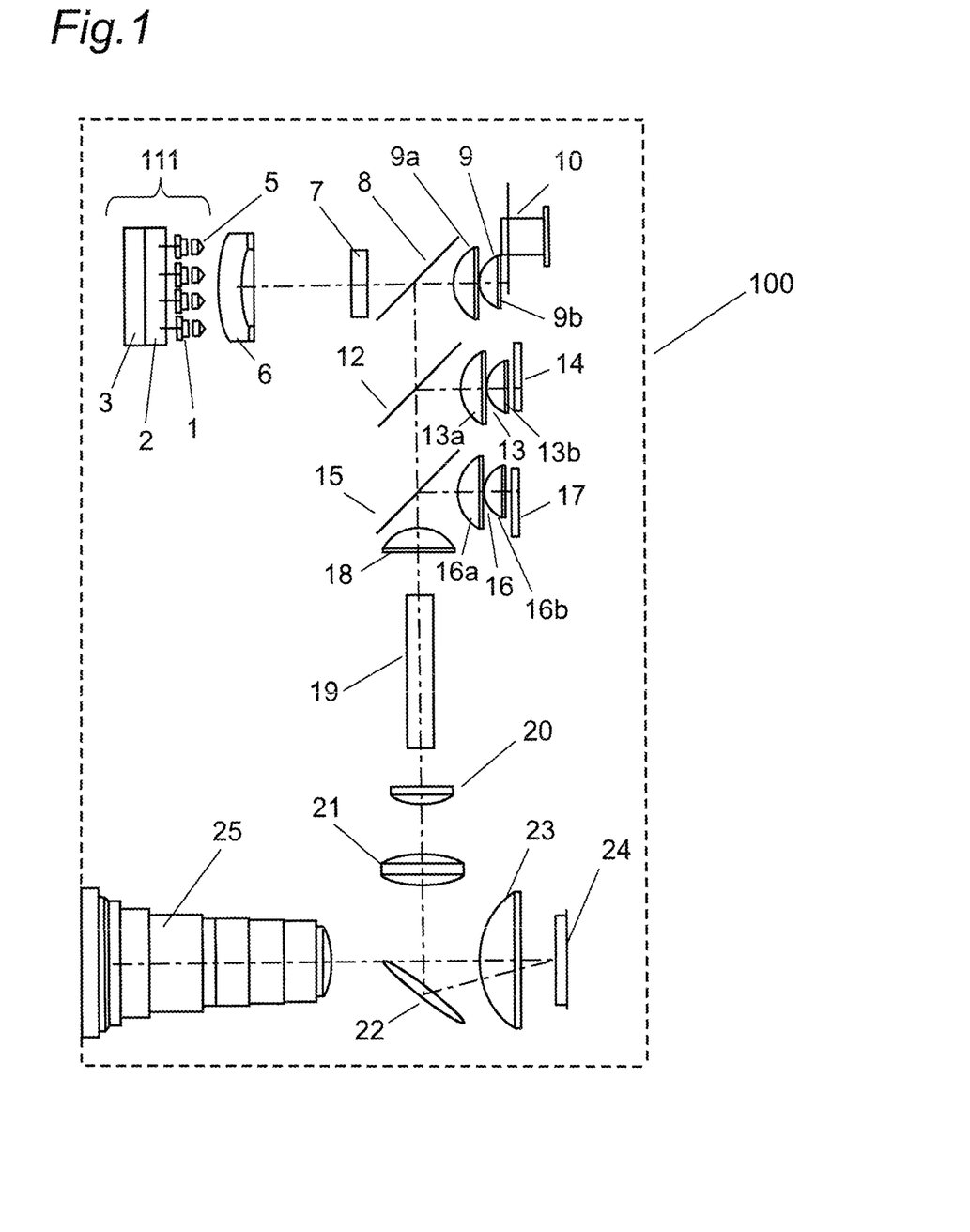
FIG. 1 is a schematic diagram showing a projection type display apparatus according to an embodiment.

FIG. 1 is a diagram showing a configuration of a projection type display apparatus 100 using a light source apparatus according to an embodiment.

The projection type display apparatus 100 includes an excitation light source 111, a DMD (Digital Mirror Device) 24, and a projection lens 25. The excitation light source 111 includes a plurality of laser diodes (LDs) 1 that emit excitation blue light, a laser holder 2, and a heatsink module 3. The plurality of laser diodes 1 are disposed on the laser holder 2 in a matrix. The laser holder 2 is formed of a material with excellent thermal conductivity, and the heatsink module 3 is arranged on the back surface of the laser holder 2.

The excitation light source 111 further includes collimator lenses 5. As will be described later, the collimator lenses 5 are held by a lens holder 11 which defines positional relationship between the collimator lens 5 and the laser diodes 1, to collimate the excitation light (blue light) from the laser diodes 1.

A condenser lens 6 collects the blue light outputted from the collimator lenses 5. The blue excitation light exiting from the condenser lens 6 enters a lens 7. The lens 7 transforms the entered light into parallel light.

The excitation blue light exiting from the lens 7 passes through a dichroic mirror 8 which allows blue light to pass therethrough and reflects green light, and then enters a condensing/collimating lens 9 including a pair of convex lenses 9a and 9b.

Figure 2A:
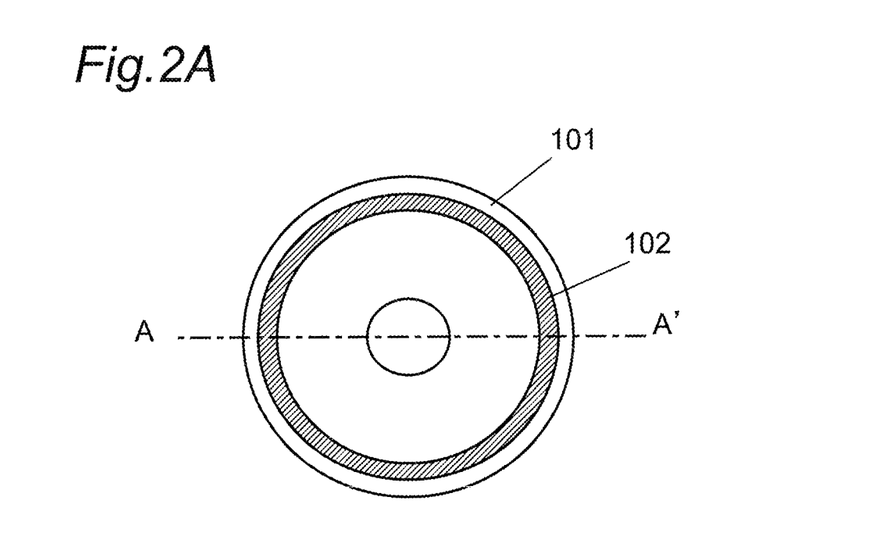
FIGS. 2A and 2B are diagrams showing a part of the projection type display apparatus according to the embodiment.
Figure 2B:
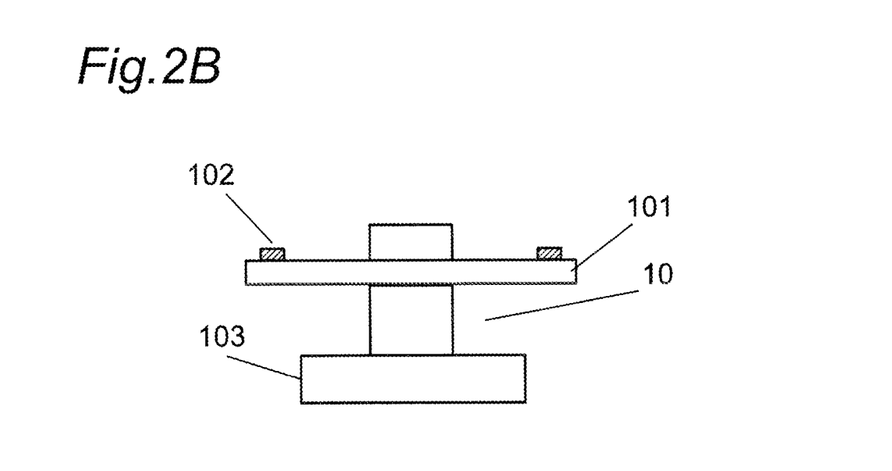

FIGS. 2A and 2B are diagrams showing the details of a phosphor wheel apparatus 10. FIG. 2A is a plan view of the phosphor wheel apparatus 10, and FIG. 2B is a side view cut along line A-A' in the plan view of FIG. 2A. The phosphor wheel apparatus 10 includes a phosphor wheel 101 and a motor 103. A green phosphor 102 is formed on the phosphor wheel 101, as a phosphor layer coated in a ring form.

Figure 3:
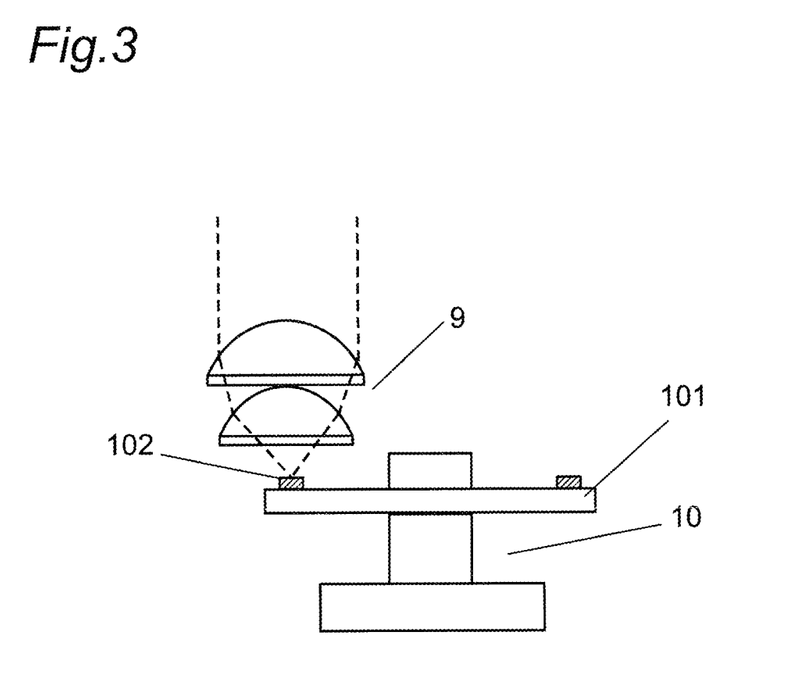
FIG. 3 is an illustrative diagram of a part of the projection type display apparatus according to the embodiment.

FIG. 3 is an illustrative diagram showing the function of the phosphor wheel apparatus 10. Blue light entering the condensing/collimating lens 9 is collected on the green phosphor 102 as shown in FIG. 3, and excites the green phosphor 102. The phosphor wheel apparatus 10 is configured to rotationally drive the phosphor wheel 101 by the motor 103. By such rotary-drive, the green phosphor 102 is prevented from being burned by blue excitation light to be collected thereon.

Green light excited by the excitation light and emitted from the green phosphor 102 of the phosphor wheel 101 enters the condensing/collimating lens 9. The light is collimated by the condensing/collimating lens 9, and exits to the dichroic mirror 8.

The dichroic mirror 8 reflects the green light from the condensing/collimating lens 9, and leads the green light into a dichroic mirror 12 which allows green light to pass therethrough and reflects red light.

A collimating lens 13 includes a pair of convex lenses 13a and 13b. A red LED (light-emitting diode) 14 is disposed so as to face the collimating lens 13, and emits red light. The red light from the red LED 14 is collimated by the collimating lens 13 and exits to the dichroic mirror 12.

The red light exiting from the collimating lens 13 is reflected by the dichroic mirror 12, subsequently entering a dichroic mirror 15 which allows red light and green light to pass therethrough and reflects blue light.

A collimating lens 16 includes a pair of convex lenses 16a and 16b. A blue LED (light-emitting diode) 17 is disposed so as to face the collimating lens 16, and emits blue light. The blue light from the blue LED 17 is collimated by the collimating lens 16 and exits to the dichroic mirror 15.

In the above-described manner, light of three colors, i.e. green light, red light, and blue light, enters a condenser lens 18. Specifically, the green light from the phosphor wheel apparatus 10 is reflected by the dichroic mirror 8 and then passes through the dichroic mirrors 12 and 15, and enters the condenser lens 18. The red light emitted by the red LED 14 is reflected by the dichroic mirror 12 and passes through the dichroic mirror 15, and then enters the condenser lens 18. The blue light emitted by the blue LED 17 is reflected by the dichroic mirror 15, and enters the condenser lens 18.

The condenser lens 18 collects the green light, the red light, and the blue light and leads the collected light to one end face of a rod integrator 19. Outgoing light that exiting from the other end face of the rod integrator 19 passes through relay lenses 20 and 21, and then exits to a total reflection mirror 22.

Light reflected by the total reflection mirror 22 enters the DMD 24 passing through a lens 23. The DMD 24 modulates the entered light according to a video signal, and allows the modulated light to exit to the projection lens 25 through the lens 23. The projection lens 25 projects the entered light onto a screen (which is not shown) with enlarged image.

Figure 4:
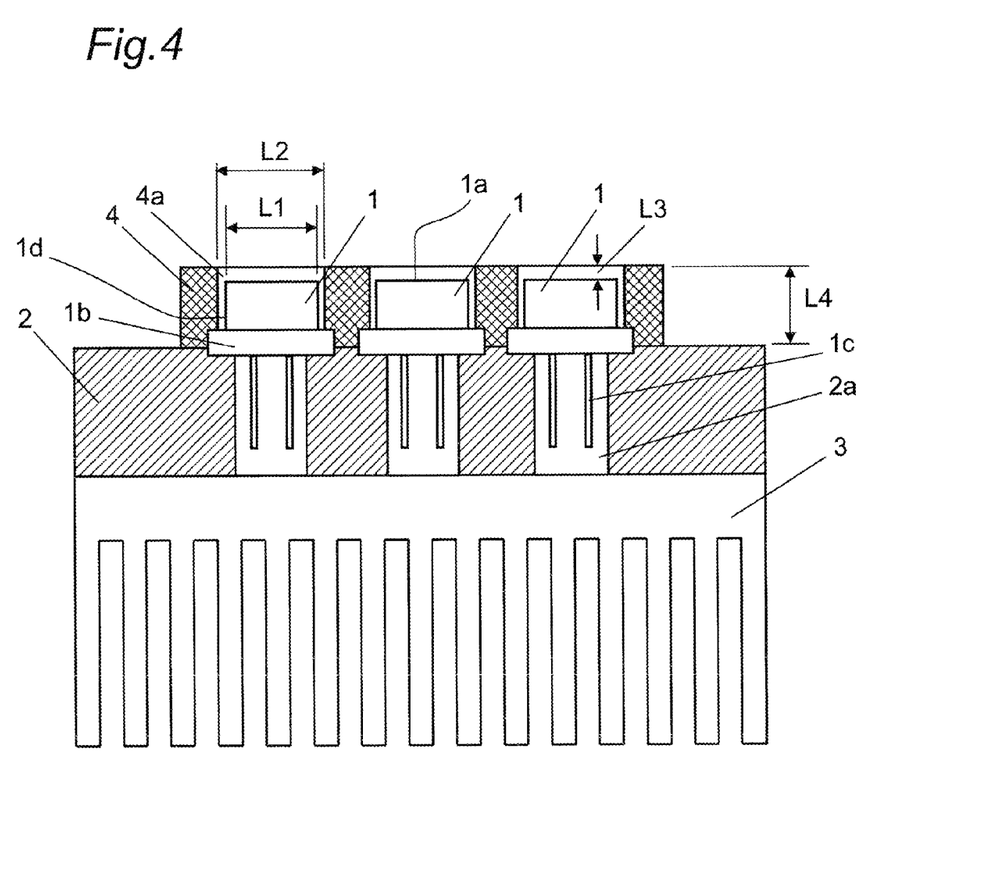
FIG. 4 is a cross-sectional view of a main part of a light source apparatus according to the embodiment.

FIG. 4 is a cross-sectional view showing an internal configuration of a main part of the excitation light source 111. The excitation light source 111 is assembled by the laser holder 2, the heatsink module 3, the laser diodes 1, and a thermal conductive elastic member 4 which are disposed in the manner shown in FIG. 4. Each laser diode 1 is disposed on the holder 2 with a flange portion 1b fitting around a hole 2a of the holder 2 and terminals 1c placed in the hole 2a of the laser holder 2. After disposing the laser diodes 1 in this manner, the thermal conductive elastic member 4 is placed to be in close contact with the laser holder 2. For the thermal conductive elastic member 4, for example, a heatsink silicone rubber sheet made of a silicone material can be used.

The thermal conductive elastic member 4 has cylindrical holes 4a with a diameter L2 slightly larger than a diameter L1 of cylindrical light-emitting portions 1a of the laser diodes 1. The thermal conductive elastic member 4 also has a thickness (L4) that projects slightly (by L3) from a head of each light-emitting portion 1a of the laser diode 1 with the thermal conductive elastic member 4 disposed on the laser holder 2 to place the light-emitting portion 1a of the laser diode 1 in the hole 4a.

Figure 5:
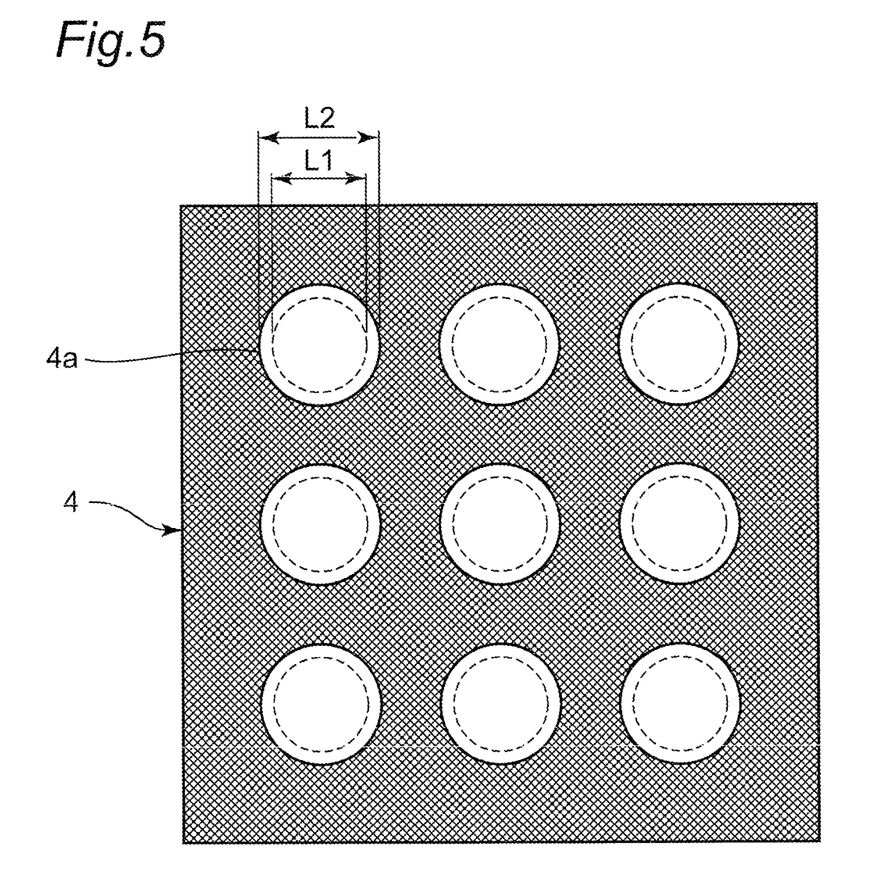
FIG. 5 is a plan view of a thermal conductive elastic member according to the embodiment.

FIG. 5 is a plan view of the thermal conductive elastic member 4. The cylindrical holes 4a are provided in a matrix in accordance with the arrangement of the laser diodes 1. One laser diode 1 fits into each hole 4a.

Figure 6:
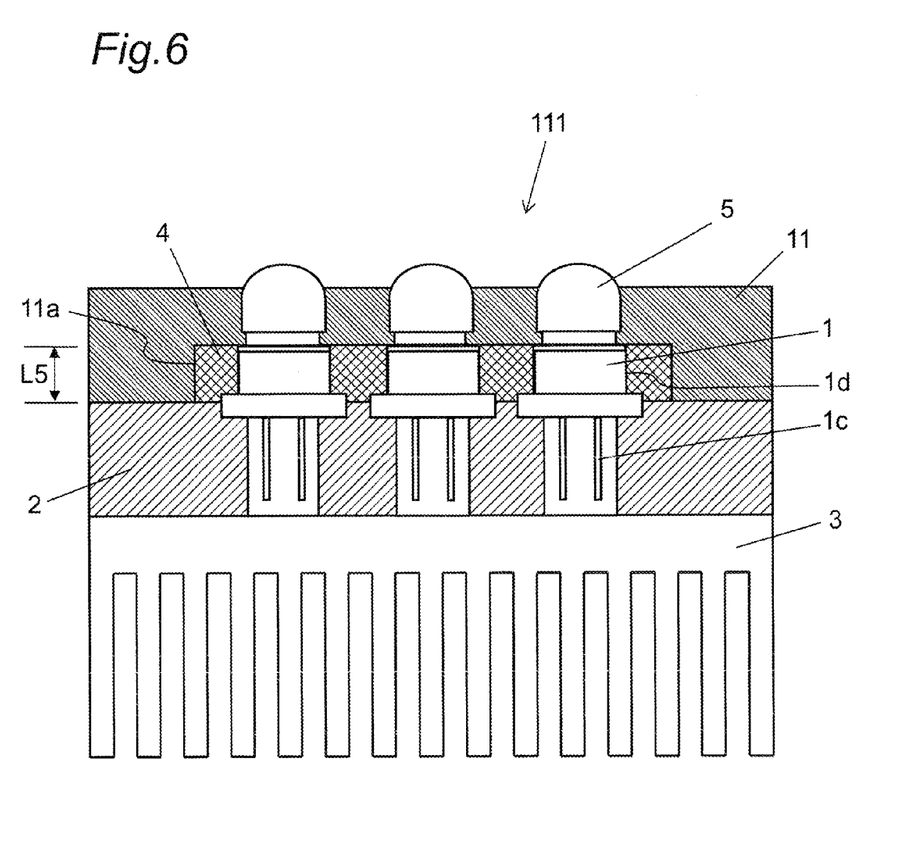
FIG. 6 is a cross-sectional view of the light source apparatus according to the embodiment.

FIG. 6 is a cross-sectional view of the excitation light source 111 with the collimator lenses 5 mounted thereon. The excitation light source 111 has a lens holder 11 mounted thereon. The lens holder 11 holds the collimator lenses 5 disposed on the side of light-emitting portion of the laser diodes 1, and defines the positions of the collimator lenses 5 and the laser diodes 1 relative to each other.

The lens holder 11 has a recess 11a which forms a region that substantially matches the contour of the thermal conductive elastic member 4. A depth L5 of the recess 11a is set to be smaller than the thickness L4 of the thermal conductive elastic member 4 and to be slightly larger than the length (L4-L3) of the thickness L4 minus the length of the projection (L3).

As shown in FIG. 6, the lens holder 11 is disposed to sandwich the thermal conductive elastic member 4 between the lens holder 11 and the laser holder 2 with the thermal conductive elastic member 4 fit in the recess 11a coincides. By disposing the lens holder 11 in this manner, the thermal conductive elastic member 4 is elastically deformed by the sandwich between the lens holder 11 and the laser holder 2, to elastically be into close contact with side surfaces 1d of the light-emitting portions 1a of the laser diodes 1. In the present embodiment, the lens holder 11 and the laser holder 2 are joined together with grease or the like having excellent thermal conductivity.

According to such a configuration, heat generated by the laser diode 1 is thermally conducted from the light-emitting portion 1a to the thermal conductive elastic member 4 in close contact with the side surface 1d of the light-emitting portion 1a. Further, the heat is thermally conducted to the laser holder 2 in close contact with the thermal conductive elastic member 4, and is then thermally conducted to the heatsink module 3, to radiate the heat. Accordingly, an increase in the temperature of the laser diode 1 can be efficiently suppressed.

In addition, when the side surface 1d of the light-emitting portion 1a of the laser diode 1 is fragile, the side surface 1d may be damaged if a strong force is applied thereto. However, in the above-described configuration, the side surface 1d is covered by the thermal conductive elastic member 4. Since the thermal conductive elastic member 4 has elasticity, an elastic shock-absorbing effect is obtained, thereby reducing the possibility of damage. Thus, the heat generated in the laser diodes 1 can be suitably taken away, and the reliability of the excitation light source 111 as a light source apparatus can be improved.

Furthermore, the above-described configuration of the thermal conductive elastic member 4, allows an enclosed space to be formed between the collimator lens 5 and the laser diode 1. Accordingly, dust does not adhere to the light-emitting portion 1a of the laser diode 1, thereby providing another effect of preventing a reduction in laser light power caused by burning of dust, or the like.

The thermal conductive elastic member 4 may be made of a silicone material. The silicone material may be formed of a composite material including inorganic particles dispersed in a base material such as silicone. Accordingly, a thermal conductive elastic member with high heat radiation performance and high elasticity can be formed, thereby facilitating both the suppression of an increase in the temperature of the laser diodes 1 and the prevention of damage to the laser diodes 1. The inorganic particles to be dispersed may be, for example, metal particles such as silver.

The excitation light source 111 of the present embodiment can be manufactured in the following manner. The laser diodes 1 are disposed on the laser holder 2 made of a thermal conductive material. Next, the thermal conductive elastic member 4, which has holes 4a larger than the diameter of light-emitting portions 1a of the laser diodes 1 and has a thickness larger than the height of the light-emitting portions 1a of the laser diodes 1, is disposed on the laser holder 2 such that the light-emitting portions 1a of the laser diodes 1 are placed in the holes 4a. Furthermore, the thermal conductive elastic member 4 sandwiched between the laser holder 2 and the lens holder 11 holding the collimator lenses 5 to be elastically deformed, thereby brought into close contact with side surfaces (1d) of the light-emitting portions 1a.

In the present embodiment, the projection type display apparatus 100 includes the excitation light source 111, the DMD 24 that modulates light from the excitation light source 111 according to a video signal, and the projection lens 25 that projects light from the DMD 24 onto a screen. By including the excitation light source 111 with improved heat radiation efficiency, the projection type display apparatus 100 can increase light output from the light source and improve the reliability of the light source.

As described above, in the present embodiment, the excitation light source 111 includes the laser diodes 1, the laser holder 2 made of a thermal conductive material, on which the laser diodes 1 are disposed, and the heatsink module 3 that radiates, through the laser holder 2, heat generated by the laser diodes 1. The excitation light source 111 further includes the collimator lenses 5, the lens holder 11 holding the collimator lenses 5 and disposed on the light-emitting portion side of the laser diodes 1, and the thermal conductive elastic member 4 having the holes 4a in which the light-emitting portions 1a of the laser diodes 1 are placed. The thermal conductive elastic member 4 is sandwiched between the laser holder 2 and the lens holder 11, to be in close contact with the side surfaces 1d of the light-emitting portions 1a.

The embodiment has been described above as exemplification of the technique disclosed in the present application. However, the technique of the present disclosure is not limited thereto, and can also be applied to embodiments in which changes, substitutions, additions, omissions, and the like are appropriately made therein. It is also possible to form new embodiments by combining the components described in the above-described embodiment. Other embodiments are exemplified below.

Other Embodiments

In the above-described embodiment, the thermal conductive elastic member 4 having the holes 4a has been described as an example of the thermal conductive member. The thermal conductive member may have holes in which the light-emitting portions of the semiconductor light sources are placed. Therefore, the thermal conductive member is not limited to the thermal conductive elastic member 4. When the thermal conductive elastic member 4 is used, the above-described effects can be obtained. For example, when the thermal conductive member has elasticity, the possibility of damage can be reduced by the elastic force thereof even if the semiconductor light sources are structurally fragile.

Figure 7:
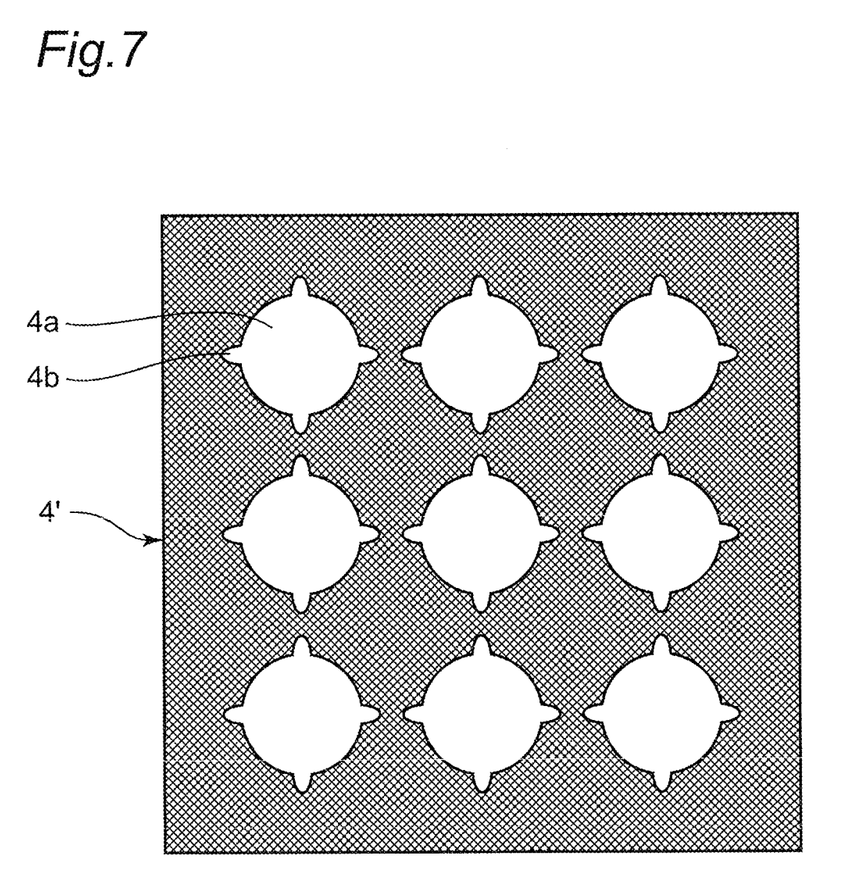
FIG. 7 is a plan view of a thermal conductive elastic member according to another embodiment.

As the thermal conductive member, a thermal conductive elastic member 4' shown in FIG. 7 may be used. FIG. 7 is a plan view of the thermal conductive elastic member 4' in another embodiment. The thermal conductive elastic member 4' is provided with a plurality of small recesses 4b along a circumference of a hole 4a. In this case, when the thermal conductive elastic member 4' is elastically deformed, a variable range in which the hole 4a is available to expand or contract can be expanded due to the deformation of the small recesses 4b. Thus, when the thermal conductive elastic member 4' with the small recesses 4b is used, variations in the accuracy of the dimensions of the laser diodes 1 can be further absorbed. As long as the small recesses 4b are provided along the circumference of the hole 4a, any number of small recesses 4b may be provided at any place on the circumference. Also, any size and shape of the small recesses 4b may be provided as long as the diameter of the hole 4a can be contracted.

Figure 8:
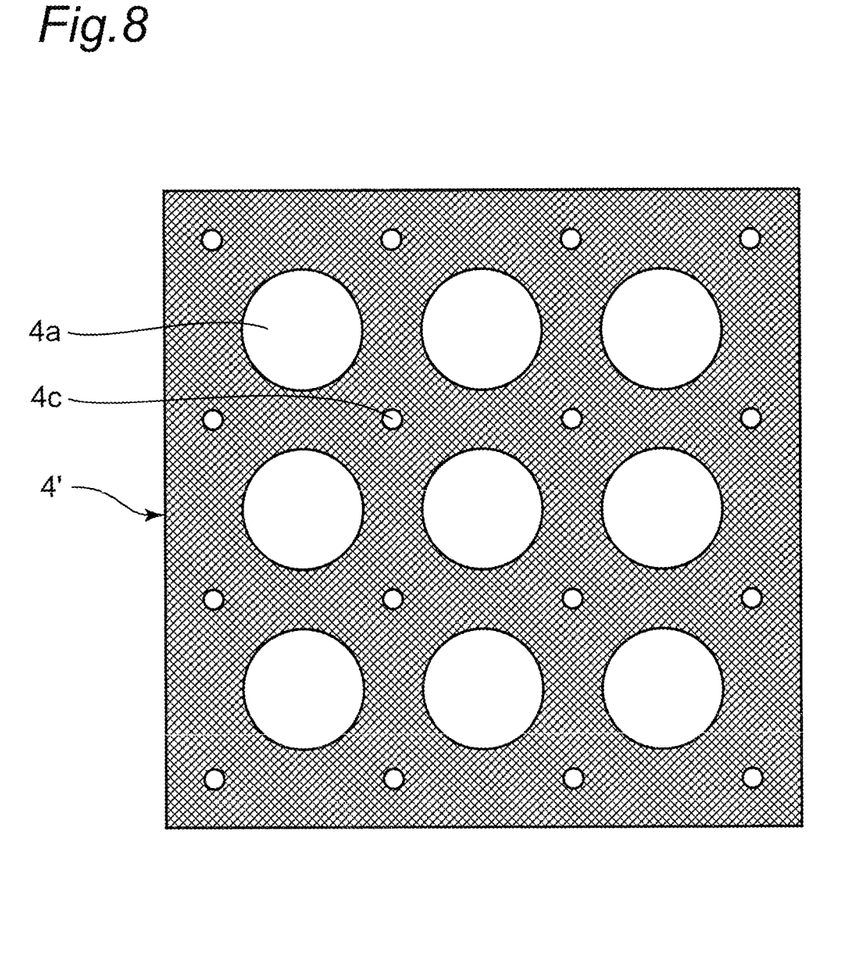
FIG. 8 is a plan view of a thermal conductive elastic member according to still another embodiment.

In addition a thermal conductive elastic member 4' shown in FIG. 8 may be used, as the thermal conductive member. FIG. 8 is a plan view of the thermal conductive elastic member 4' in still another embodiment. The thermal conductive elastic member 4' may be provided with small holes 4c in positions different from those of holes 4a. In this case, when the thermal conductive elastic member 4' is elastically deformed, a variable range in which the holes 4a are available to expand or contract can be expanded due to the deformation of the small holes 4c. Thus, when the thermal conductive elastic member 4' provided with the small holes 4c is used, variations in the accuracy of the dimensions of the laser diodes 1 can be further absorbed. FIG. 8 is not intended to limit the number, position, shape, and the like of the small holes 4c.

In addition, other thermal conductive members may be used instead of the thermal conductive elastic member. In other words, other thermal conductive members may be brought into close contact with the side surfaces 1d of the laser diodes 1. For other thermal conductive members, for example, there exist thermal conductive soft members such as a phase change sheet and a thermal conductive filler. Specifically, a phase change sheet may be used and brought into close contact with the side surfaces 1d of the laser diodes 1. Alternatively, using a thermal conductive filler, the region occupied by the thermal conductive elastic member 4 in FIG. 6 may be filled with the filler instead of the thermal conductive elastic member 4. Alternatively, a phase change sheet and a thermal conductive filler may be combined together. In such an embodiment, a soft member may be used which does not melt at temperatures lower than or equal to the temperature at which the laser diodes 1 emit light, e.g., 50 to 60 degrees Celsius. By the soft member, a shock-absorbing effect is obtained, thereby reducing the possibility of damage to the laser diodes 1.

When such materials are used, a thermal conductive member comes into close contact with the side surfaces 1d of the laser diodes 1. Thus, an increase in the temperature of the laser diodes 1 at light emission can be efficiently suppressed.

The embodiments have been described above as exemplification of the technique of the present disclosure. For this purpose, the accompanying drawings and the detailed description are provided.

Therefore, the components described in the accompanying drawings and the detailed description may include not only components necessary for solving the problem, but also components not necessary for solving the problem in order to exemplify the above-described technique. Hence, if those unnecessary components are described in the accompanying drawings and the detailed description, it should not be acknowledged that such fact directly founds that the unnecessary components are necessary.

In addition, since the above-described embodiments are to exemplify the technique of the present disclosure, various changes, substitutions, additions, omissions, and the like may be made therein within the range of the claims or within the range of equivalency of the claims.

INDUSTRIAL APPLICABILITY

The present disclosure can be applied to, for example, a light source apparatus for a projection type display apparatus.

What is claimed is:

1. A light source apparatus comprising:
a semiconductor light source;
a light source holding member on which the semiconductor light source is disposed, the light source holding member being made of a thermal conductive material;
a cooling member that radiates heat generated by the semiconductor light source, through the light source holding member;
an optical lens;
an optical lens holding member holding the optical lens and disposed on a light-emitting portion side of the semiconductor light source; and
a thermal conductive member made of an elastic material and having a hole in which a light-emitting portion of the semiconductor light source is placed, wherein
the thermal conductive member is elastically deformed between the light source holding member and the optical lens holding member, and is in close contact with a side surface of the light-emitting portion by the elastic deformation, and
the optical lens holding member is made of thermal conductivity material, and the light source holding member and the optical lens holding member are joined together with grease having thermal conductivity.

2. The light source apparatus according to claim 1, wherein the thermal conductive elastic member is made of a silicone material.

3. The light source apparatus according to claim 1, wherein the thermal conductive member is made of a phase change sheet.

4. The light source apparatus according to claim 1, wherein the thermal conductive member is provided with at least one or more recesses along a circumference of the hole.

5. The light source apparatus according to claim 1, wherein the thermal conductive member is provided with another hole in a position different from that of the hole.

6. A projection type display apparatus comprising:
a light source apparatus according to claim 1;
an optical modulation apparatus that modulates light from the light source apparatus according to a video signal; and
a projection optical apparatus that projects light from the optical modulation apparatus onto a screen.

7. A method of manufacturing a light source apparatus including a semiconductor light source, the method comprising:
disposing a semiconductor light source on a light source holding member made of a thermal conductive material;
disposing, on the light source holding member, a thermal conductive elastic member which has a hole larger than a diameter of a light-emitting portion of the semiconductor light source and has a thickness larger than a height of the light-emitting portion of the semiconductor light source such that the light-emitting portion of the semiconductor light source is placed in the hole;
sandwiching the thermal conductive elastic member between the light source holding member and an optical lens holding member holding an optical lens; and
elastically deforming the thermal conductive elastic member to be in close contact with a side surface of the light-emitting portion by the elastic deformation,
wherein the optical lens holding member is made of thermal conductivity material, and the light source holding member and the optical lens holding member are joined together with grease having thermal conductivity.

* * * * *